United States Patent
Chayama et al.

(10) Patent No.: US 6,949,666 B2
(45) Date of Patent: Sep. 27, 2005

(54) PROCESS FOR PRODUCING POLYORGANOSILOXANE WITH SOLID-ACID ZIRCONIUM OXIDE CATALYST

(75) Inventors: Yasunori Chayama, Komatsu (JP); Ikutaro Morikawa, Yokohama (JP); Hiroaki Shoji, Tokyo (JP)

(73) Assignee: Nippon Unicar Company Limited, Tokyo (JP)

( * ) Notice: Subject to any disclaimer, the term of this patent is extended or adjusted under 35 U.S.C. 154(b) by 0 days.

(21) Appl. No.: 10/499,660

(22) PCT Filed: Nov. 1, 2002

(86) PCT No.: PCT/JP02/11433

§ 371 (c)(1),
(2), (4) Date: Feb. 16, 2005

(87) PCT Pub. No.: WO2004/039868

PCT Pub. Date: May 13, 2004

(65) Prior Publication Data

US 2005/0119434 A1 Jun. 2, 2005

(51) Int. Cl.$^7$ ............................. C07F 7/02; C07F 7/08; C07F 7/18

(52) U.S. Cl. ...................... 556/450; 556/406; 556/426; 556/427; 556/429; 556/451; 556/453; 556/455; 556/459; 556/460; 556/464

(58) Field of Search .............................. 556/450, 406, 556/426, 427, 429, 451, 453, 455, 459, 460, 464

(56) References Cited

U.S. PATENT DOCUMENTS

| 5,708,113 A | 1/1998 | Beuschel et al. |
| 5,767,216 A | 6/1998 | Frances et al. |
| 6,107,235 A | 8/2000 | Matsuzawa |

FOREIGN PATENT DOCUMENTS

| EP | 313095 A2 | 4/1989 |
| EP | 728793 A1 | 8/1996 |
| EP | 925830 A1 | 6/1999 |

OTHER PUBLICATIONS

Cover Sheet of WO 98/09727 A1, published Mar. 12, 1998./Cited in the International Search Report./Corresponds to USP 6107235 and EP 925830 A1.

Patent Abstracts of Japan No. 8–253589, published Oct. 1, 1996./Cited in the International Search Report./Corresponds to USP 5767216 and EP 728793 A1.

Patent Abstracts of Japan No. 7–278307, publsihed Oct. 24, 1995./Cited in the International Search Report.

Patent Abstracts of Japan No. 6–234856, published Aug. 23, 1994/Cited in the International Search Report.

Patent Abstracts of Japan No. 8–239476, published Sep. 17, 1996./Cited in the International Serach Report.

Patent Abstracts of Japan No. 2000–169486, published Jun. 20, 2000./Cited in the International Search Report.

Patent Abstracts of Japan No. 1–111709 published Apr. 28, 1989./Cited in the International Search Report./Corresponds to EP 313095 A2.

Patrial translation of Japanese Publication No. 10–502966 published Mar. 17, 1998./Cited in the International Search Report./Corresponds to USP 5708113 and WO 96/03455 A1.

Cover Sheet of WO 96/03455 A1, published Feb. 8, 1996./ Corresponds to JP 10–502966.

*Primary Examiner*—Elvis O. Price
(74) *Attorney, Agent, or Firm*—Armstrong, Kratz, Quintos, Hanson & Brooks, LLP (57) ABSTRACT

The method for producing polyorganosiloxane from at least one type of organosilicon compound having a siloxane unit or alkoxysilane by the equilibrating reaction involving cleavage and recombination of the silicon-oxygen bond as a method carried out in the presence of an acidic catalyst capable of giving the product in high productivity and yield, corrosive to the system to a limited extent, and remaining in the product to a limited extent or degrading product quality to a limited extent if it remains, wherein a solid, acidic zirconium oxide catalyst is used as the acidic catalyst.

6 Claims, 5 Drawing Sheets

PROCESS FOR PRODUCING POLYORGANOSILOXANE WITH SOLID-ACID ZIRCONIUM OXIDE CATALYST

BACKGROUND OF THE INVENTION

1. Field of the Invention

The present invention relates to a method for producing polyorganosiloxane using a solid, acidic zirconium oxide catalyst, more particularly a method for producing a polyorganosiloxane from at least one type of organosilicon compound having a siloxane unit or alkoxysilane as a starting material in the presence of an acidic catalyst, wherein a solid, acidic zirconium oxide catalyst is used as the acidic catalyst to produce the polyorganosiloxane by the equilibrating reaction involving cleavage and recombination of the silicon-oxygen bond.

2. Description of the Prior Art

Polyorganosiloxane has been widely used in the chemical industry because of its high resistance to heat, cold weather and radioactive ray, excellent electrical characteristics, and peculiar interfacial characteristics, e.g., low surface tension. Polymerization for producing polyorganosiloxane is generally based on an equilibrating reaction involving cleavage/recombination of a siloxane chain present in a cyclic polyorganosiloxane, low-molecular-weight linear polyorganosiloxane or organoalkoxysilane in the presence of an acidic or basic catalyst, or hydrolysis and subsequent dehydration/condensation of dichloroorganosilane, dialkoxydiorganosilane or the like.

In particular, an equilibrating reaction has been extensively employed because of low hazardousness of the starting material and easiness of controlling polymerization degree of the product. This reaction has been widely used for various purposes, e.g., for reducing polymerization degree of polyorganosiloxane and introduction of a functional group, in addition to polymerization. For example, the equilibrating reaction between polydimethylsiloxane and hexamethyldisiloxane can realize low polymerization degree. It can make cyclic polyorganosiloxane, when controlled at an elevated temperature and vacuum. Moreover, the equilibrating reaction between, e.g., a hydrolysis/condensation product of N-β-(aminoethyl)-γ-aminopropylmethyldimethoxysilane and dimethylpolysiloxane in the presence of an alkali catalyst can produce an amino-modified polysiloxane.

A number of materials have been proposed as the catalysts for the above-described equilibrating reactions. They include those based on sulfuric acid, hydrochloric acid, a Lewis acid, sodium hydroxide, potassium hydroxide, tetramethyl ammonium hydroxide, butyl phosphonium silanolate, an amine and phosphonitrile halide. However, these catalysts are not highly efficient, because they need a neutralization step and removal of the neutralization product for catalyst inactivation and removal. Moreover, the recovered neutralization product is difficult to recycle, because of its incompatibility with a filtration aid, polysiloxane or the like, and is at present disposed by incineration or land filling.

The production processes which can replace the present processes, which massively discharge wastes, are increasing in the midst of the heightened requirements for environmental protection. In particular, use of an acidic catalyst is essential for production of polyorganosiloxane, which contains the $\equiv$Si—H bond, because the bond is undesirably reactive in the presence of an alkali catalyst. An acidic catalyst should be incorporated at as high as 1 to 5 parts by volume per 100 parts by volume of the starting material to secure a practical reaction rate. Therefore, it involves a disadvantage of massively discharging wastes.

Moreover, these acidic catalysts are very corrosive to metals, and the system needs expensive materials corrosion-resistant or lined.

Recently, polyorganosiloxanes have been going into materials for electronic devices or the like, which need highly refined starting materials. However, the polyorganosiloxanes produced in the presence of a conventional catalyst tend to have limited applications, because of trace quantities of the catalyst, neutralization product, neutralizer or the like remaining in the product.

Solid, acidic catalysts, e.g., zeolite, ion-exchanging resin, acid-activated acidic clay, have been proposed. However, few conventional acidic catalysts have been massively used, because of the reaction rate being impractically low over them.

SUMMARY OF THE INVENTION

It is an object of the present invention to find out a catalyst for production of polyorganosiloxane from an organosilicon compound containing the silicon-oxygen bond, high in productivity, giving the product in a high yield, corrosive to the system to a limited extent, and remaining in the product to a limited extent or degrading product quality to a limited extent if it remains, to solve the problems involved in the conventional catalysts. It is another object to find out conditions under which the catalyst is used.

The inventors of the present invention have tested a number of acidic catalysts for production of polyorganosiloxane from an organosilicon compound containing the silicon-oxygen bond to solve the above problems, and found that a specific, acidic catalyst can give a high-quality polyorganosiloxane in high productivity and yield, achieving the present invention.

The first aspect of the present invention is a method for producing polyorganosiloxane from at least one type of organosilicon compound having a siloxane unit or alkoxysilane in the presence of an acidic catalyst by the equilibrating reaction involving cleavage and recombination of the silicon-oxygen bond, wherein a solid, acidic zirconium oxide catalyst is used as the acidic catalyst.

The second aspect of the present invention is the method of the first aspect for producing polyorganosiloxane, wherein the equilibrating reaction is achieved continuously with at least one type of organosilicon compound having a siloxane unit or alkoxysilane being continuously supplied into a reactor containing the solid, acidic zirconium oxide catalyst and treated for a residence time of 10 minutes to 2 hours.

The third aspect of the present invention is the method of the first aspect for producing polyorganosiloxane, wherein the equilibrating reaction is achieved batchwise with at least one type of organosilicon compound having a siloxane unit or alkoxysilane being treated in a reactor containing the solid, acidic zirconium oxide catalyst, incorporated at 0.01 to 100 parts by weight per 100 parts by weight of at least one type of the organosilicon compound having a siloxane unit or alkoxysilane, for a residence time of 10 minutes to 100 hours.

The fourth aspect of the present invention is the method of the second or third aspect for producing polyorganosiloxane, wherein the equilibrating reaction is carried out at −10 to 200° C.

The fifth aspect of the present invention is the method of the first aspect for producing polyorganosiloxane, wherein at least one type of organosilicon compound having a siloxane unit or alkoxysilane contains hydrosilyl group.

The sixth aspect of the present invention is the method of the first aspect for producing polyorganosiloxane, wherein the solid, acidic zirconium oxide catalyst is produced by the following steps:
(a) kneading aluminum hydroxide and/or hydrous oxide, zirconium hydroxide and/or hydrous oxide, and a compound containing sulfuric acid,
(b) forming the above mixture, and
(c) firing the formed product at a temperature at which zirconia of the tetragonal structure is produced.

DETAILED DESCRIPTION OF THE INVENTION

The method of the present invention for producing polyorganosiloxane using a solid, acidic zirconium oxide catalyst is described in detail for each item.

1. Organosilicon Compound Having a Siloxane Unit

The organosilicon compound having a siloxane unit for the present invention serves as a starting material for producing polyorganosiloxane using a solid, acidic zirconium oxide catalyst. These compounds include cyclic polyorganosiloxane and linear polysiloxane.

(1) Cyclic Polyorganosiloxane

The cyclic polyorganosiloxane for the present invention is represented by the chemical formula (1):

(1)

(wherein, $R^1$ and $R^2$ are each a monovalent organic, SH or hydroxyl group, or hydrogen atom; and "n" is an integer of 3 to 12).

The organic groups represented by $R^1$ and $R^2$ in the formula (1) include a substituted or unsubstituted alkyl group of 1 to 100 carbon atoms, alkylene group of 1 to 100 carbon atoms, substituted or unsubstituted alkoxy group of 1 to 100 carbon atoms and substituted or unsubstituted aryl group of 1 to 100 carbon atoms. The unsubstituted alkyl groups include methyl, ethyl, propyl, butyl and octyl. The unsubstituted alkoxy groups include methoxy, ethoxy, propoxy and butoxy, and aryl groups include phenyl, tolyl, benzyl and phenylethyl. The substituted alkyl groups include —$C_3H_6(C_2H_4O)_a(C_3H_6O)_bR^3$ ("a" and "b" are each an integer of 0 to 100, where at least one of "a" and "b" is 1 or more; and $R^3$ is an alkyl group of 1 to 8 carbon atoms or acyl group of 1 to 8 carbon atoms, or hydrogen atom), carboxyalkylene, alkyloxycarbonylalkylene, acryloxyalkylene, methacryloxyalkylene, halogenated alkyl, sulfoalkylene and hydroxyalkylene. The substituted alkoxy groups include alkoxyalkyleneoxy and halogenated alkoxy.

The specific examples of the cyclic polyorganosiloxane represented by the chemical formula (1) include those represented by the chemical formulae (2) to (6):

(2)

(3)

(4)

(5)

(6)

The still more specific examples include hexamethylcyclotrisiloxane, octamethylcyclotetrasiloxane, decamethylcyclopentasiloxane, dodecamethylcyclohexasiloxane and hexadecamethylcyclooctasiloxane.

A cyclic polyorganosiloxane for the present invention is transformed into the linear one by ring-opening polymerization in the presence of a solid, acidic zirconium oxide catalyst. A cyclic polyorganosiloxane, when present alone, may be theoretically polymerized to have an extremely high polymerization degree, and it is necessary to stop the polymerization step before an equilibrium is completely attained, in order to secure a desired polymerization degree.

It should be noted that a cyclic polyorganosiloxane is also an objective product of the present invention, which is produced by the equilibrating reaction at an elevated temperature and vacuum in the presence of a solid, acidic zirconium oxide catalyst.

When a cyclotetrasiloxane containing a functional group is to be produced, the following cyclic polyorganosiloxanes containing a functional group, represented by one of the chemical formulae (7) to (13), are useful as the starting monomers.

(wherein, "a" is 0 to 100, and "b" is 0 to 100).

(2) Linear Polysiloxane

The linear polysiloxane in the present invention is the compound represented by the chemical formula (14):

(14)

(wherein, R is independently monovalent organic, SH or hydroxyl group, or hydrogen atom; and "n" is an integer of 1 to 1,000,000, inclusive).

The organic groups represented by R in the formula (14) include a substituted or unsubstituted alkyl group of 1 to 100 carbon atoms, alkylene group of 1 to 100 carbon atoms, substituted or unsubstituted alkoxy group of 1 to 100 carbon atoms and substituted or unsubstituted aryl group of 1 to 100 carbon atoms. The unsubstituted alkyl groups include methyl, ethyl, propyl, butyl and octyl. The unsubstituted alkoxy groups include methoxy, ethoxy, propoxy and butoxy, and aryl groups include phenyl, tolyl, benzyl and phenylethyl. The substituted alkyl groups include —$C_3H_6$ ($C_2H_4O)_a(C_3H_6O)_bR^3$ ("a" and "b" are each an integer of 0 to 100, where at least one of "a" and "b" is 1 or more; and $R^3$ is an alkyl group of 1 to 8 carbon atoms or acyl group of 1 to 8 carbon atoms, or hydrogen atom), carboxyalkylene, alkyloxycarbonylalkylene, acryloxyalkylene, methacryloxyalkylene, halogenated alkyl, sulfoalkylene and hydroxyalkylene. The substituted alkoxy groups include alkoxyalkyleneoxy and halogenated alkoxy.

Of these, an organosilicon compound having a hydrosilyl group with at least one of Rs being hydrogen atom is the compound for which the present invention is particularly useful, because a basic catalyst cannot be used for its production.

The linear polysiloxane described above can be polymerized to have a high polymerization degree by an equilibrating reaction with a cyclic polyorganosiloxane. Moreover, an equilibrating reaction may be used for two types of linear polysiloxanes of different polymerization degree to produce a linear polysiloxane of intermediate polymerization degree. For example, a linear polyorganosiloxane of high polymerization degree can have a decreased polyorganosiloxane by an equilibrating reaction with a polysiloxane of low polymerization degree, e.g., hexamethyldisiloxane. Moreover, an equilibrating reaction of linear polyorganosiloxane at an elevated temperature and vacuum can give a cyclic polyorganosiloxane and linear polyorganosiloxane of decreased polymerization degree. As described above, a linear polyorganosiloxane is an objective product as well as a starting material for the present invention.

(3) Silicone-Based Terminal Stopper

As described above, a cyclic polyorganosiloxane, when present alone, may be theoretically polymerized in the presence of an acidic catalyst to have an extremely high polymerization degree, and it is necessary to stop the polymerization step before an equilibrium is completely attained. It is therefore difficult to control the reaction, and a terminal stopper is preferably used for the equilibrating reaction. The preferable terminal stopper components include siloxanes, e.g., hexamethyldisiloxane, 1,1,3,3-tetramethyldisiloxane and 1,3-divinyl-1,1,3,3-tetramethyldisiloxane. The starting materials for these stopper components can be obtained by distilling hydrolysis/condensation products, e.g., dichlorodiorganosilane, dichloroorganosilane, chlorotriorganosilane and chlorodiorganosilane. The commercial products useful as a stopper include a polydimethylsiloxane (L-45 (10), Nippon Unicar, viscosity: 10 mm²/second, number of silicon atoms: about 14 on the average).

A diorganopolysiloxane capable of stopping silanol chaining has a function of terminal stopping. This compound is a linear silicone-based polymer, represented by the chemical formula (14), and having a viscosity of around 5 to 900 cP at 25° C., hydroxyl group at both terminals and molecular weight of around several hundreds to thousands.

2. Alkoxysilane

The alkoxysilanes for the present invention means triorganomonoalkoxysilane represented by $R^4{}_3$—Si—$OR^5$, diorganodialkoxysilane represented by $R^4{}_2$—Si—$(OR^5)_2$, monoorganotrialkoxysilane represented by $R^4$—Si—$(OR^5)_3$, tetraalkoxysilane represented by Si—$(OR^5)_4$ and the like.

In the above formulae, $R^4$ is a monovalent organic or SH group, or hydrogen atom. The organic groups include a substituted or unsubstituted alkyl group of 1 to 100 carbon atoms, alkylene group of 1 to 100 carbon atoms and substituted or unsubstituted aryl group of 1 to 100 carbon atoms. The unsubstituted alkyl groups include methyl, ethyl, propyl, butyl and octyl, and aryl groups include phenyl, tolyl, benzyl and phenylethyl. The substituted alkyl groups include —$C_3H_6(C_2H_4O)_a(C_3H_6O)_bR^3$ ("a" and "b" are each an integer of 0 to 100, where at least one of "a" and "b" is 1 or more; and $R^3$ is an alkyl group of 1 to 8 carbon atoms or acyl group of 1 to 8 carbon atoms, or hydrogen atom), carboxyalkylene, alkyloxycarbonylalkylene, acryloxyalkylene, methacryloxyalkylene, halogenated alkyl, sulfoalkylene and hydroxyalkylene.

$R^5$ is an alkyl group of 1 to 6 carbon atoms or alkoxyalkyl of 2 to 8 carbon atoms. They include methyl, ethyl, propyl, butyl, hexyl and methoxymethyl.

(1) Triorganomonoalkoxysilane

A triorganomonoalkoxysilane is a monofunctional, terminal-treating agent (producing a group represented by M), and can produce a linear polyorganosiloxane by the equilibrating reaction with a cyclic polyorganosiloxane.

More specifically, triorganomonoalkoxysilanes include trimethylmethoxysilane, triethylethoxysilane, triphenylmethoxysilane and triphenylethoxysilane.

(2) Diorganodialkoxysilane

A diorganodialkoxysilane is a difunctional compound (producing a group represented by D), and can serve as a monomer copolymerizable with a cyclic polyorganosiloxane.

More specifically, diorganodialkoxysilanes include dimethyldimethoxysilane, diethyldimethoxysilane, dimethyldiethoxysilane, diethyldiethoxysilane, diphenyldimethoxysilane, diphenyldiethoxysilane, methylphenyldimethoxysilane, methylphenyldiethoxysilane, ethylphenyldimethoxysilane and ethylphenyldiethoxysilane.

When a polysiloxane containing a functional group is to be produced, the following dialkoxysilanes containing a functional group, represented by one of the chemical formulae (15) to (21), are useful as the starting monomers.

(wherein, "a" is 0 to 100, and "b" is 0 to 100).

(3) Monoorganotrialkoxysilane

A monoorganotrialkoxysilane is a trifunctional compound (producing a group represented by T), and can produce a branched polyorganosiloxane by an equilibrating reaction with a cyclic polyorganosiloxane.

Monoorganotrialkoxysilanes useful for the present invention include methyltrimethoxysilane, ethyltriethoxysilane, phenyltrimethoxysilane and phenyltriethoxysilane.

When a polysiloxane containing a functional group is to be produced, the following trialkoxysilanes containing a functional group, represented by one of the chemical formulae (22) to (28), are useful as the starting monomers.

(wherein, "a" is 0 to 100, and "b" is 0 to 100).

(4) Tetraalkoxysilane

A tetraalkoxysilane is a tetrafunctional compound (producing a group represented by Q), and can produce a branched polyorganosiloxane by an equilibrating reaction with a cyclic polyorganosiloxane.

Tetraalkoxysilanes useful for the present invention include tetramethoxysilane, tetraethoxysilane, tetrabutoxysilane and tetrapropoxysilane.

3. Solid, Acidic Zirconium Oxide Catalyst

A solid, acidic zirconium oxide catalyst for the present invention may be a known one. For example, it may be prepared by a process involving treatment of zirconium hydroxide with sulfuric acid and subsequent firing at 300° C. or higher. It is particularly preferable to use the solid, acidic zirconium oxide catalyst prepared by a process involving the following steps:

(a) kneading aluminum hydroxide and/or hydrous oxide, zirconium hydroxide and/or hydrous oxide, and a compound containing sulfuric acid,
(b) forming the above mixture, and
(c) firing the formed product at a temperature at which zirconia of the tetragonal structure is produced, because of its high catalytic activity and easiness of separation after it is used for the reaction. The method for producing the catalyst is known, as disclosed by, e.g., WO98/09727. It is particularly preferable when formed into particles or pellets of around 1 mm in size. One of the commercial catalysts suitably used is SZA-60 (Japan Energy).

4. Method for Producing Polyorganosiloxane

The polyorganosiloxane for the present invention is produced by the equilibrating reaction of at least one type of organosilicon compound having the above-described siloxane unit or alkoxysilane in the presence of a solid, acidic zirconium oxide catalyst. The reaction may be carried out either continuously or batchwise.

The equilibrating reaction means the reaction in which at least one type of organosilicon compound having the siloxane unit is or alkoxysilane as a starting material treated in the presence of an acidic catalyst to produce a polyorganosiloxane of new molecular weight distribution by cleavage and recombination of the silicon-oxygen bond.

When the equilibrating reaction is carried out batchwise, an adequate quantity of the starting material for polyorganosiloxane undergoes the reaction in the presence of an adequate quantity of the catalyst with stirring in a reactor. On completion of the reaction, the catalyst is separated from the reaction mixture, and the product is separated from the reaction mixture.

When the equilibrating reaction is carried out continuously, the starting material is continuously charged into a slurry reactor with backmixing, where it is continuously stirred, and the effluent is discharged also continuously. It may be also carried out in a pipeline reactor, where the starting material moves in a plug flow through the reactor filled with the catalyst. The movement is characterized by plug flow, where the starting material is converted as it moves, with essentially no mixing with the starting material from the starting material partly converted.

The pipeline reactor is preferably oriented vertically, because the reaction stream moving upwards while passing over the catalyst has an increased freedom of flow. It may move downwards, which, however, compresses the catalyst and tends to limit its freedom of flow.

It is preferable to control the reaction conditions, e.g., temperature and product concentration in the reaction zone, and reaction time by controlling flow rate of the reaction stream into or out of the reaction zone, whether the reactor is of slurry or pipeline type.

Residence time in a continuous reactor, i.e., reaction time realized by controlling flow rate of the reaction stream into or out of the reaction zone, is preferably 10 minutes to 2 hours, more preferably 15 to 60 minutes, still more preferably 20 to 45 minutes. It can be determined by dividing the free volume (mL) determined by measuring in the reaction zone by flow rate (mL/minute) of the reaction stream passing through the reactor. The reaction zone is the whole volume of the reaction mixture in the case of a slurry reactor, and the zone filled with the catalyst in the case of a pipeline reactor.

In the batch system, the catalyst is incorporated preferably at 0.01 to 100 parts by weight per 100 parts by weight of at least one type of organosilicon compound having a siloxane unit or alkoxysilane as the starting material, more preferably 0.1 to 50 parts, still more preferably 1 to 10 parts. Reaction time for the equilibrating reaction is preferably 10 minutes to 100 hours, more preferably 1 to 10 hours.

The reaction may be carried out generally at the normal pressure, whether in a batch or continuous system. It may be also carried out at a vacuum or elevated pressure, in order to control the reaction conditions, e.g., reaction time and temperature of the reaction mixture. Reaction temperature is preferably −10 to 200° C., more preferably 10 to 80° C., still more preferably 20 to 65° C. The reaction rate is insufficient when it is below the above range. At a temperature beyond the above range, on the other hand, the siloxane chain will become unstable, retarding the silicon-oxygen recombination reaction, with the result that the objective product may be difficult to produce, in spite of the increased cost for heating. Therefore, a reaction temperature out of the above range is not desirable.

On completion of the equilibrating reaction, the catalyst is separated from the reaction mixture by an adequate means, e.g., filtration, decantation or centrifugal separation, to be reused. In the continuous system, the catalyst is simply retained in the reactor, to which the fresh reaction stream is charged and from which the product is discharged.

After the catalyst is separated, the residual, unreacted starting mixture may be extracted from the reaction mixture by distillation or stripping with an inert gas, e.g., steam or nitrogen, whether the reaction system is operated batchwise or continuously.

EXAMPLES

The present invention is described in more detail by EXAMPLE, which by no means limits the present invention. The GPC analysis was carried out in EXAMPLE and COMPARATIVE EXAMPLES for the products or the like by the following procedure.

GPC analysis:

Number-average molecular weight (Mn) was determined by gel permeation chromatography (GPC) under the following conditions.

Analyzer: GPC analysis system (JASCO)

Column: Shodex-803L (Showa Denko)

Detector: Refractive index (RI) detector RL540 R (GL Science)

Calibration curve: A total of 10 types of standard polystyrene (molecular weight: $1.2 \times 10^3$ to $2.75 \times 10^6$, Showa Denko) was used to prepare the calibration curve.

Measurement: Chloroform was passed at 1.0 mL/minute at 40° C., into which 100 μL of the sample (concentration: 0.3% by weight) was injected.

Example 1

A flow reactor system equipped with a pressure gauge was assembled by connecting a pump, reactor tower (inner diameter: 15 mm), back-pressure valve and Erlenmeyer flask (500 ml) equipped with a magnetic stirrer, in this order. The reactor tower was charged with 20 mL of zirconia sulfate (SZA-60, Japan Energy) as a solid, acidic zirconium oxide catalyst, and sealed with glass wool at both ends. The zirconia sulfate was slightly crushed in a mortar to have a uniform size of 10 to 20 meshes, and fired at 350° C. in an oven for 2 hours just before it was charged into the reactor.

Figure 1:
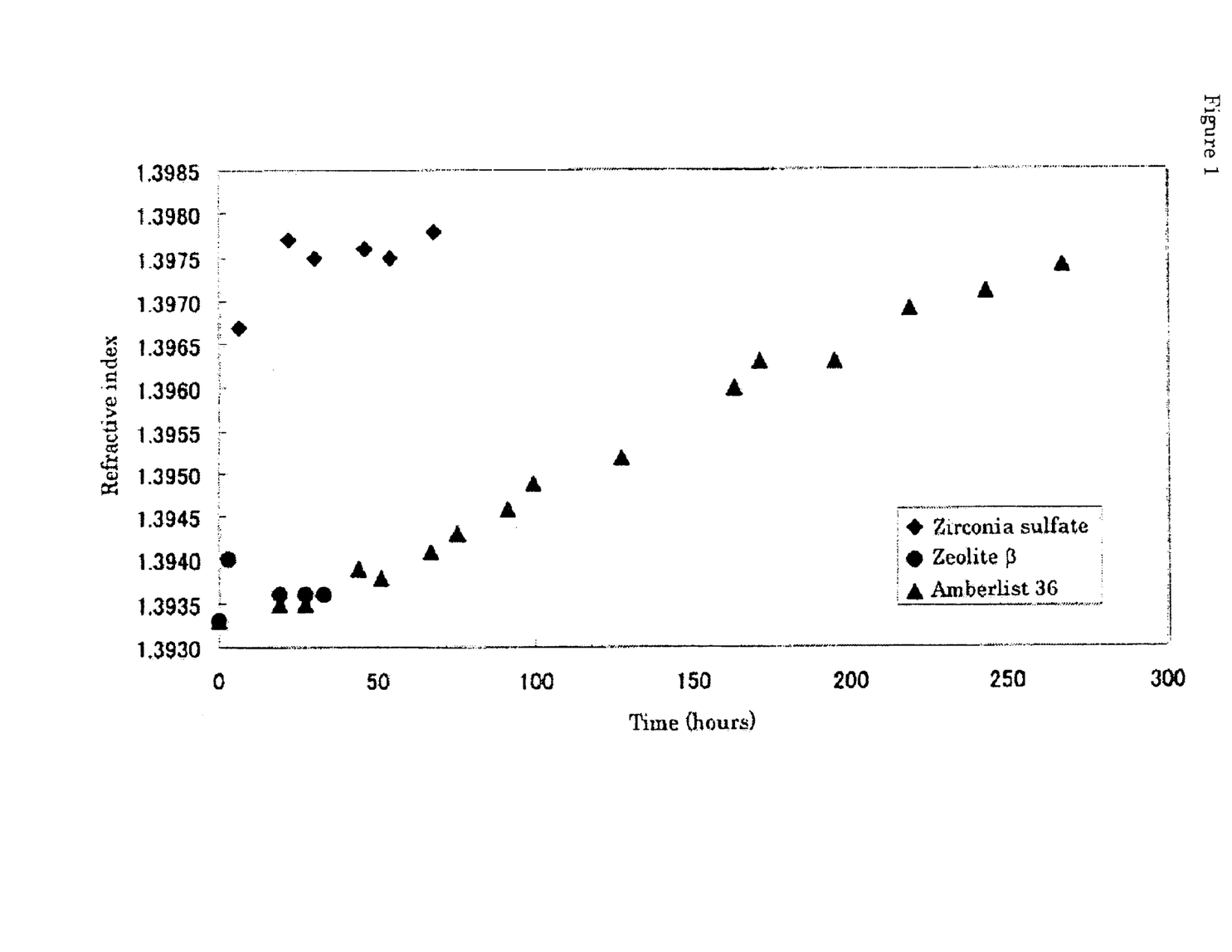
FIG. 1 plots refractive index of the reaction products (polyorganosiloxanes) prepared in EXAMPLES or COMPARATIVE EXAMPLES against reaction time.
Figure 2:
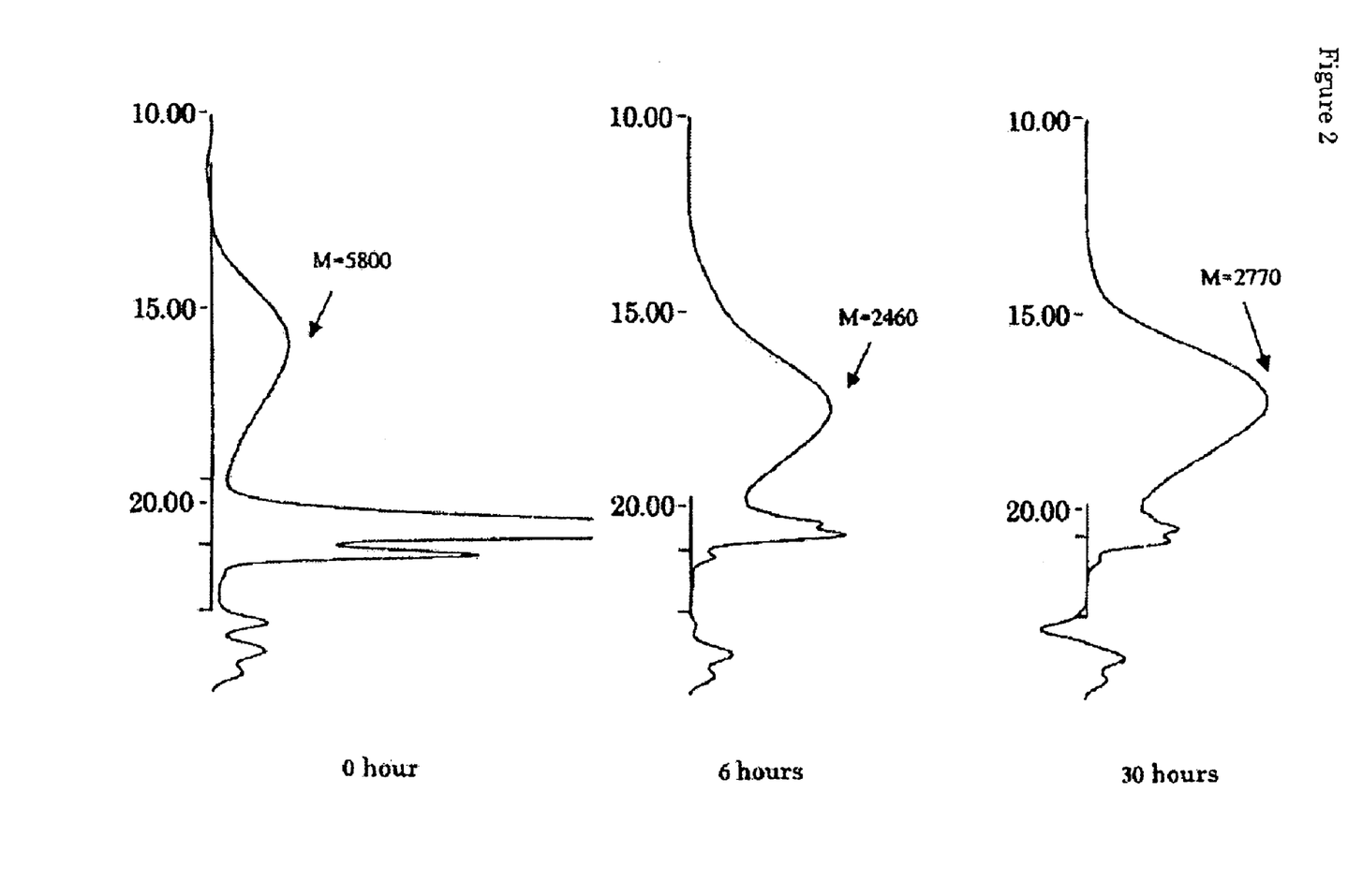
FIG. 2 presents the GPC chart of the reaction product (polyorganosiloxane) prepared in EXAMPLE 1.

The Erlenmeyer flask was charged with 290 mL of a mixture of 7.87% by weight of hexamethyldisiloxane (Me₃SiOSiMe₃), 42.86% by weight of methyl hydrogen polysiloxane (Me₃Si[OSi(H)(Me)]₃₇OSiMe₃, L-31, Nippon Unicar) and 49.27% by weight of octamethylcyclotetrasiloxane (SiMe₂O)₄, Y-7175, Nippon Unicar) as the starting mixture well-mixed beforehand to be uniform. The mixture was circulated at 67 g/hour in the reactor system, with stirring at 25° C. About 3 mL of the reaction solution was withdrawn from the flask by syringe at intervals of several hours, to be analyzed for refractive index and by GPC. FIG. 1 plots refractive index of the reaction solution against reaction time of up to 75 hours. FIG. 2 shows the GPC charts of the initial solution, and the solutions undergoing the reaction for 6 and 30 hours. It was observed that refractive index of the reaction solution reached a constant level in about 6 hours (FIG. 1), and that the solutions undergoing the reaction for 6 and 30 hours had almost the same GPC patterns (FIG. 2), and had almost the same molecular weights of the peak component flowing out in a retention time of 15 to 20 minutes. It is therefore considered, based on these results, that an equilibrium is attained in about 6 hours.

It is therefore found that the equilibrating reaction proceeds, whereby a compound having a molecular weight intermediate between those of hexamethyldisiloxane and methyl hydrogen polysiloxane (L-31) is transformed into a linear polyorganosiloxane of higher polymerization degree in the presence of octamethylcyclotetrasiloxane.

Comparative Example 1

Figure 3:
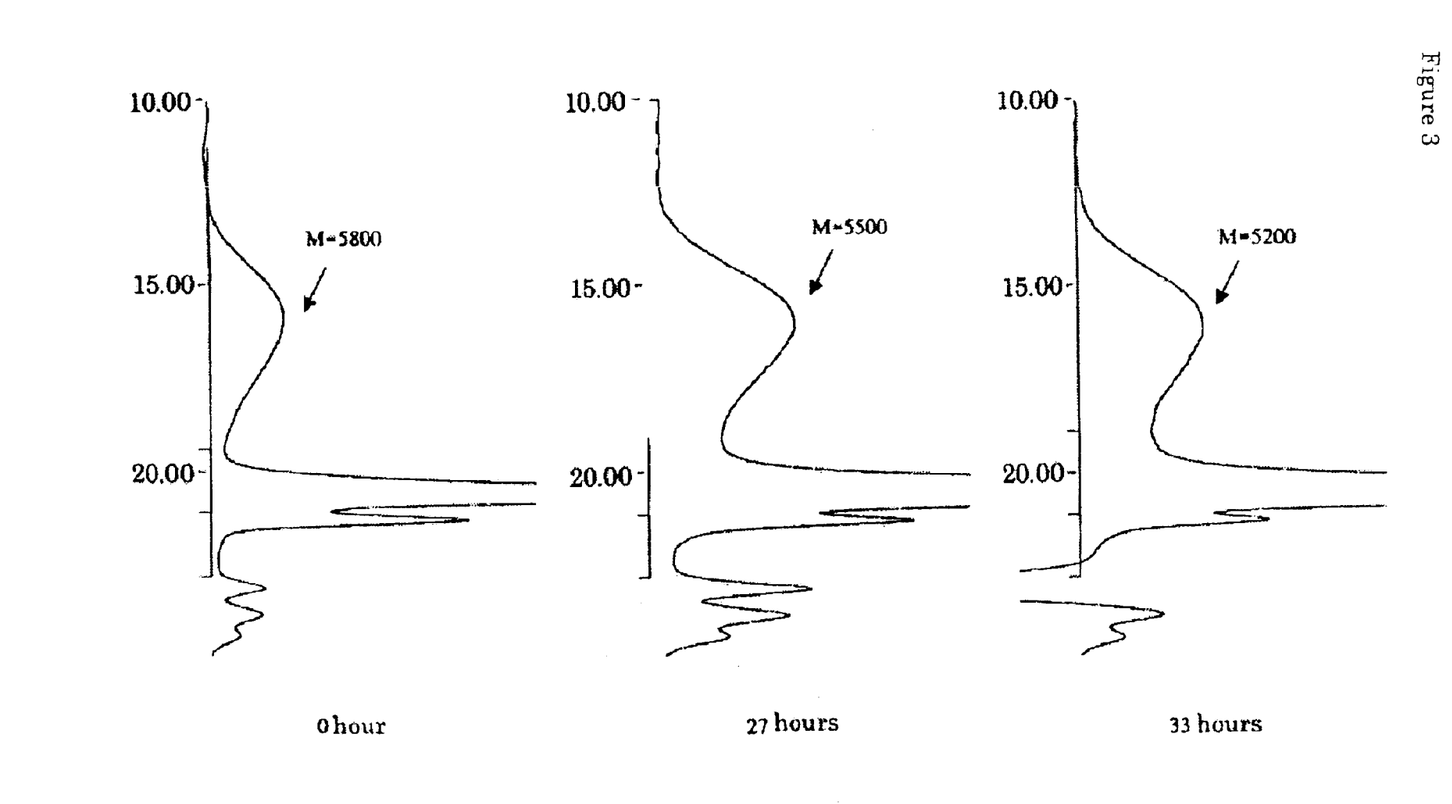
FIG. 3 presents the GPC chart of the reaction product (polyorganosiloxane) prepared in COMPARATIVE EXAMPLE 1.

The test was carried out for up to 33 hours in the same manner as in EXAMPLE 1, except that the catalyst was replaced by zeolite β (HSZ-930HOD1A, Tosoh), to measure refractive index and GPC-determined molecular weight of the reaction solution. FIG. 1 plots refractive index of the reaction solution against reaction time. As shown, refractive index of the solution changes little with time even for 33 hours, at which the test was stopped because of no symptom of change anticipated. FIG. 3 shows the GPC charts of the initial solution, and the solutions undergoing the reaction for 27 and 33 hours. As shown, these solutions had almost the same GPC patterns. They had almost the same molecular weights of the peak component flowing out in a retention time of 15 to 20 minutes. It is therefore considered that no reaction proceeds in this system.

Comparative Example 2

Figure 4:
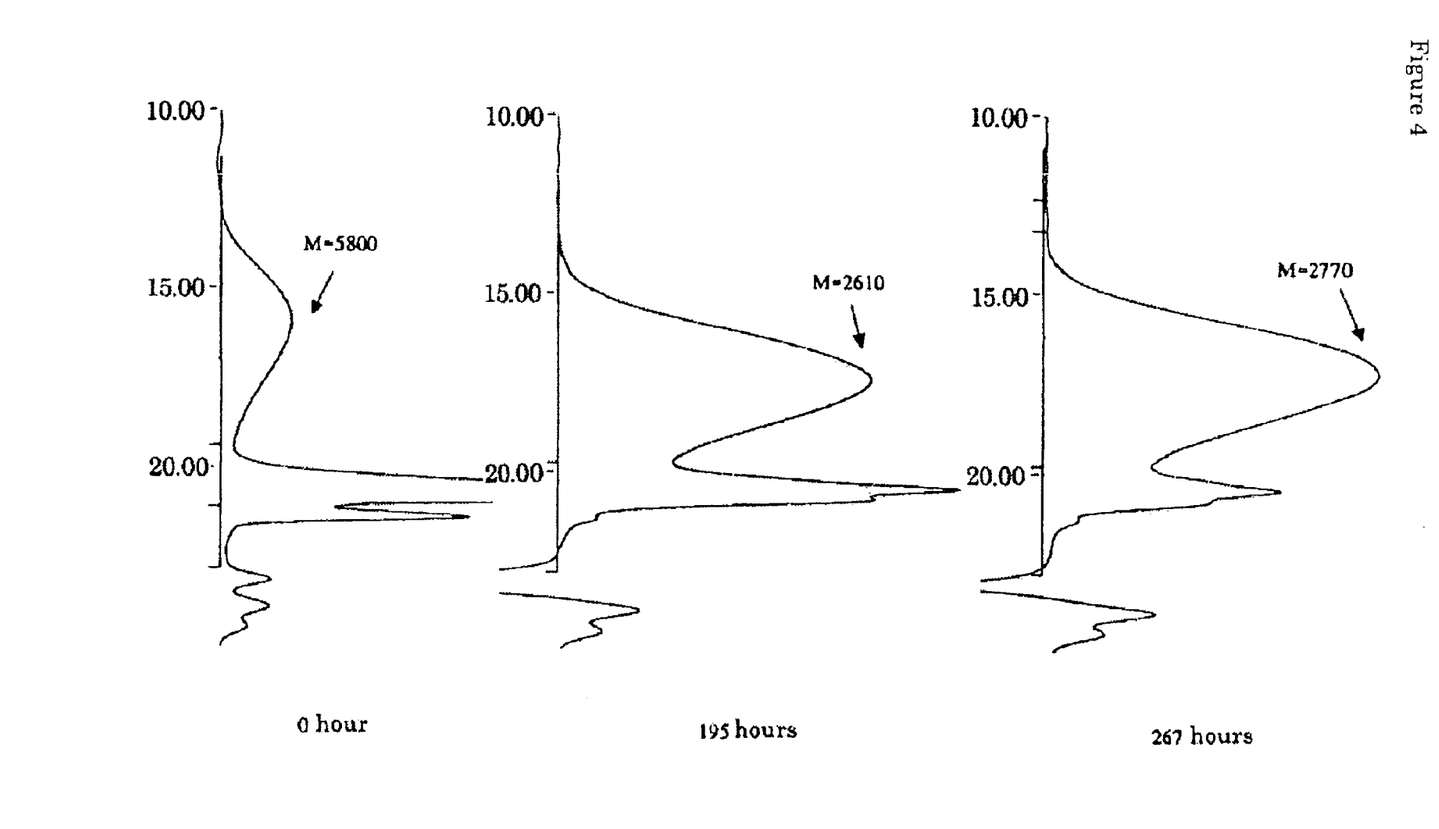
FIG. 4 presents the GPC chart of the reaction product (polyorganosiloxane) prepared in COMPARATIVE EXAMPLE 2.

The test was carried out for 267 hours in the same manner as in EXAMPLE 1, except that the catalyst was replaced by a strongly acidic, cation-exchanging resin (Amberlist 36, Organo), to measure refractive index and GPC-determined molecular weight of the reaction solution. FIG. 1 plots refractive index of the reaction solution against reaction time. FIG. 4 shows the GPC charts of the initial solution, and the solutions undergoing the reaction for 195 and 267 hours. As shown in FIG. 1, refractive index of the solution continued to change for 267 hours, indicating that an equilibrium was not attained for this time period. The GPC pattern also continued to change for 195 and 267 hours (FIG. 4), and so did molecular weight of the peak component flowing out in a retention time of 15 to 20 minutes, also indicating that an equilibrium was not attained for 267 hours. To conclude: the reaction of this system does proceed but at a low rate, taking a fairly long time (around 300 hours) to attain an equilibrium.

Comparative Example 3

Figure 5:
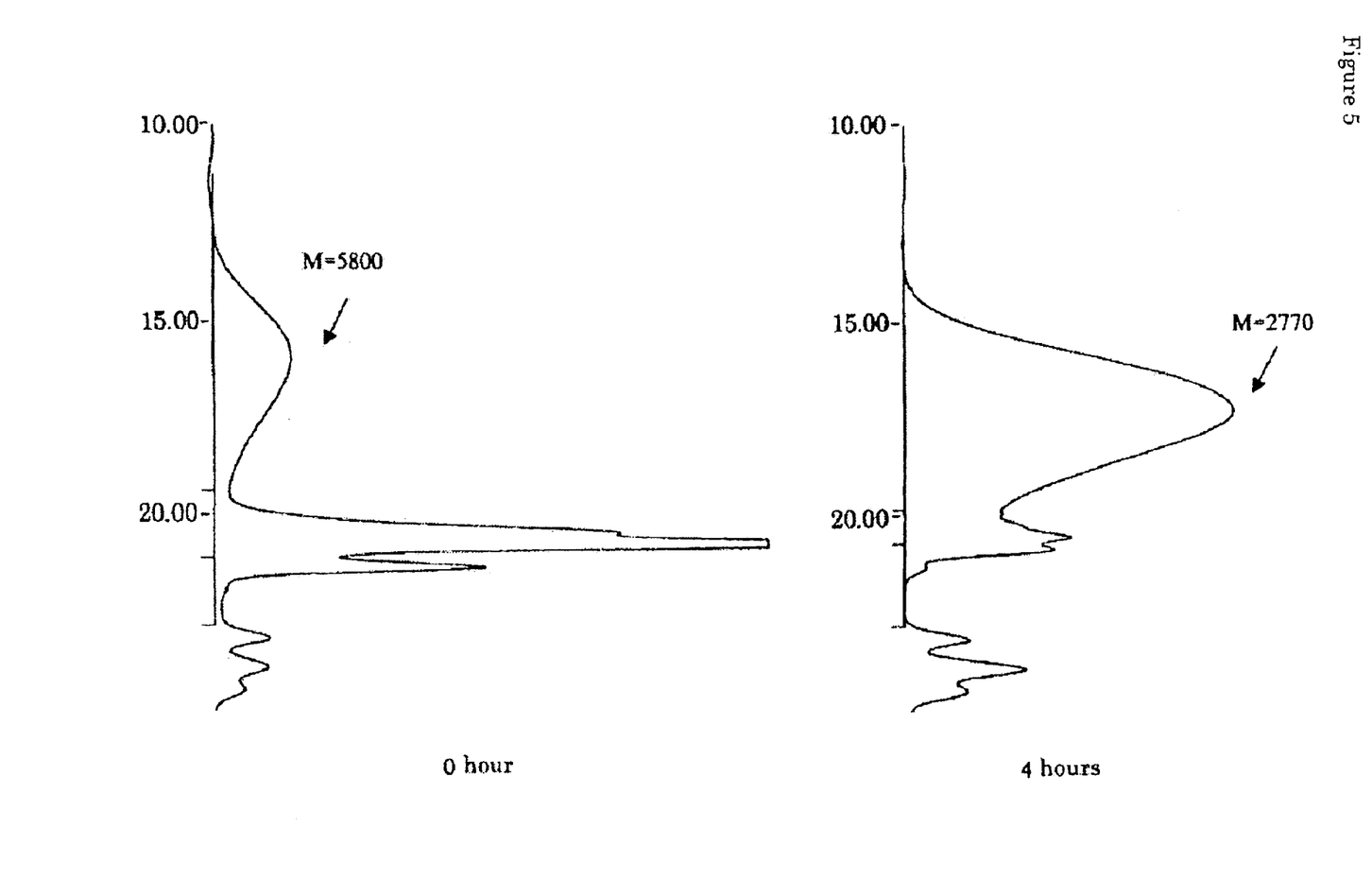
FIG. 5 presents the GPC chart of the reaction product (polyorganosiloxane) prepared in COMPARATIVE EXAMPLE 3.

A 1 L kettle was charged with 500 g of the starting mixture of the same composition as that used in EXAMPLE 1, which was stirred at 25° C. and atmospheric pressure for 12 hours in a nitrogen atmosphere in the presence of 25.0 g (2.5 pph) of concentrated sulfuric acid as the catalyst. The effluent was incorporated with 125 g (12.5 pph) of sodium hydrogen carbonate NaHCO₃ and stirred for 4 hours for neutralization. The effluent was filtered through filter paper under pressure, and the filtrate was recovered as the product. It was analyzed for its refractive index and GPC-determined molecular weight. The refractive index was 1.3974 and molecular weight was 2700. FIG. 5 shows the GPC charts of the initial solution and the solution undergoing the reaction for 4 hours. These patterns were similar to those prepared in EXAMPLE 1. Molecular weight of the peak component flowing out in a retention time of 15 to 20 minutes was also the same as that prepared in EXAMPLE 1. Therefore, the reaction system attained an equilibrium in 4 hours. The reaction was similar in equilibrium kinetics to that observed in EXAMPLE 1, but produced much more wastes.

The method of the present invention for producing polyorganosiloxane has various favorable effects, e.g., giving the high-quality product containing only limited quantities of impurities at a high reaction rate in high productivity and yield, suffering corrosion of the production system to only a limited extent, operating for extended periods continuously without shut-down for repair and without replacing the catalyst to reduce the production cost.

What is claimed is:

1. A method for producing polyorganosiloxane from at least one type of organosilicon compound having a siloxane unit or alkoxysilane in the presence of an acidic catalyst by the equilibrating reaction involving cleavage and recombination of the silicon-oxygen bond, wherein a solid, acidic zirconium oxide catalyst is used as the acidic catalyst.

2. The method for producing polyorganosiloxane according to claim 1, wherein the equilibrating reaction is achieved continuously with at least one type of the organosilicon compound having a siloxane unit or alkoxysilane being continuously supplied into a reactor containing the solid, acidic zirconium oxide catalyst and treated for a residence time of 10 minutes to 2 hours.

3. The method for producing polyorganosiloxane according to claim 1, wherein the equilibrating reaction is achieved batchwise with at least one type of the organosilicon compound having a siloxane unit or alkoxysilane being treated in a reactor containing the solid, acidic zirconium oxide catalyst, incorporated at 0.01 to 100 parts by weight per 100 parts by weight of at least one type of the organosilicon compound having a siloxane unit or alkoxysilane, for a residence time of 10 minutes to 100 hours.

4. The method for producing polyorganosiloxane according to claim 2 or 3, wherein the equilibrating reaction is carried out at −10 to 200° C.

5. The method for producing polyorganosiloxane according to claim 1, wherein at least one type of the organosilicon compound having a siloxane unit or alkoxysilane contains hydrosilyl group.

6. The method for producing polyorganosiloxane according to claim 1, wherein the solid, acidic zirconium oxide catalyst is produced by the following steps:

(a) kneading aluminum hydroxide and/or hydrous oxide, zirconium hydroxide and/or hydrous oxide, and a compound containing sulfuric acid, (b) forming the above mixture, and (c) firing the formed product at a temperature at which zirconia of the tetragonal structure is produced.

* * * * *